Oct. 1, 1963  M. W. LA RUE, JR  3,105,428
BACKLIGHTING AND REFLECTANCE ERROR COMPENSATION DEVICES
Filed June 12, 1961  2 Sheets-Sheet 1
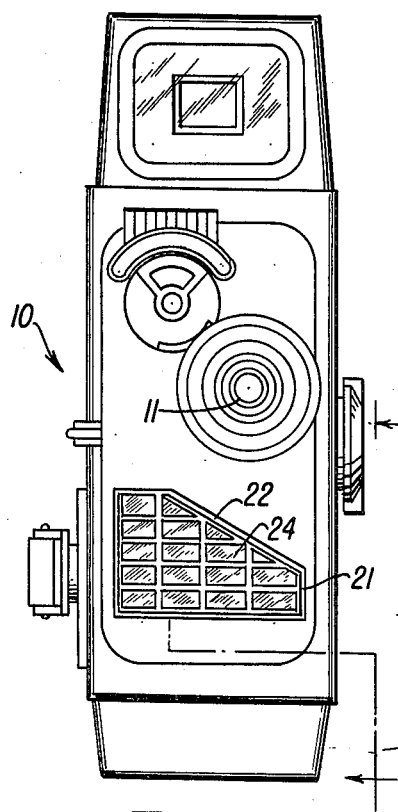
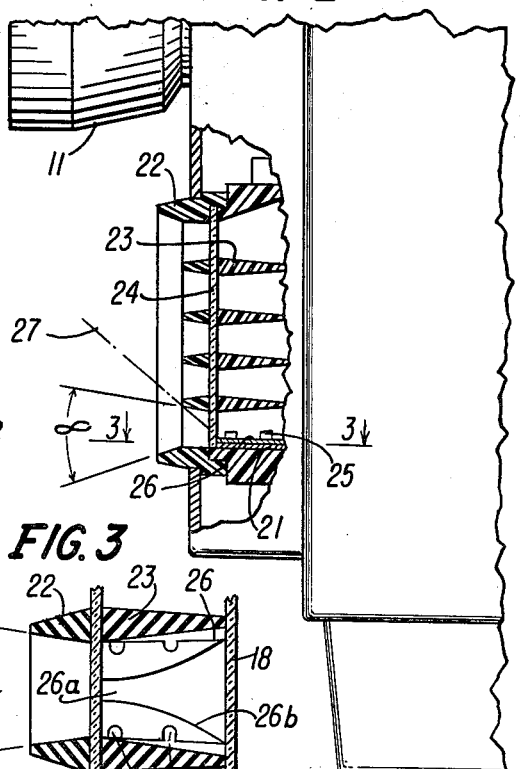
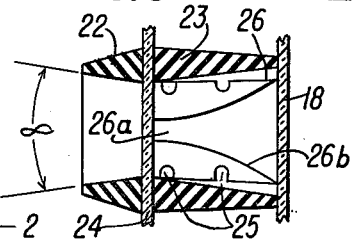
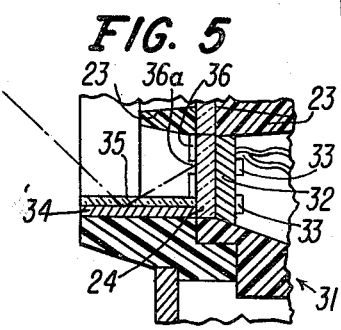
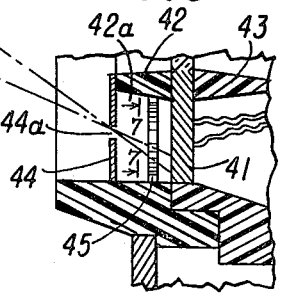
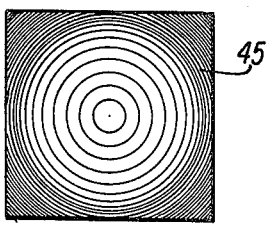
Inventor
Mervin W. LaRue Jr.
By Robert F. Miehle
Attys.

Oct. 1, 1963   M. W. LA RUE, JR   3,105,428
BACKLIGHTING AND REFLECTANCE ERROR COMPENSATION DEVICES
Filed June 12, 1961   2 Sheets-Sheet 2

INVENTOR.
Mervin W. LaRue Jr.
BY
Robert F. Michle
Attys.

United States Patent Office 3,105,428
Patented Oct. 1, 1963

3,105,428
BACKLIGHTING AND REFLECTANCE ERROR COMPENSATION DEVICES
Mervin W. La Rue, Jr., Cuba Township, Lake County, Ill., assignor to Bell & Howell Company, Chicago, Ill., a corporation of Illinois
Filed June 12, 1961, Ser. No. 116,462
4 Claims. (Cl. 95—10)

This invention relates to backlighting and reflectance error compensation devices, and more particularly to cameras having automatic exposure control devices automatically compensating for backlighting and reflectance error.

In the use of a photographic exposure control, it is highly important that the photocell receive light from a selected field of view. Grids or reticular lenses are commonly used to define the field of view. However, in order to receive sufficient light on the photocell to control the meter or exposure control, particularly for direct driven exposure controls, the exposure control field of view normally is substantially larger than that of the photographic objective and this aggravates the error from backlighting and the reflection from backlighting. A backlighting detecting and compensating device which works well is disclosed and claimed in co-pending application Serial No. 816,796, filed May 29, 1959, and assigned to the common assignee. This latter device compensates excellently for backlighting effects from direct rays of the sun but does not fully compensate for reflectance on the grid of the photocell driving the exposure control, and it would be desirable to fully compensate for the error from reflectance.

An object of the invention is to provide automatic exposure controls fully compensated for backlighting and reflectance error.

Another object of the invention is to provide an exposure control receiving reflected light from the sun in backlighted scenes inversely to the angle of the sun with the camera axis.

Another object of the invention is to provide an exposure control having a compensating photocell with a hood and a patterned mask.

A further object of the invention is to provide an exposure control having a main photocell at the back of a field defining grid with a compensating photocell positioned at the bottom of one cell of the grid to receive direct rays of the sun outside the field of view of the main photocell and preferably with a differentiating mask over the compensating photocell to decrease the light on that photocell geometrically relative to the angle between the sun and the camera axis.

Another object of the invention is to provide an exposure control in which a main photocell is mounted behind a field defining grid and a compensating photocell is mounted behind one cell of the grid along with a reflector positioned at the bottom of that cell of the grid to reflect light rays to the compensating photocell.

A complete understanding of the invention may be obtained from the following detailed description of backlight and reflectance error compensation devices forming specific embodiments thereof, when read in conjunction with the appended drawings, in which:

FIG. 1 is a front view of a camera having an automatic exposure control forming one embodiment of the invention;

FIG. 2 is a fragmentary side elevation view of the camera of FIG. 1 shown partially in section;

FIG. 3 is an enlarged horizontal sectional view taken along line 3—3 of FIG. 2;

FIG. 5 is an enlarged, fragmentary, vertical sectional view of a backlight and reflectance error compensation device of a camera forming an alternate embodiment of the invention;

FIG. 6 is an enlarged, fragmentary, vertical sectional view of a backlight and reflectance error compensation device of a camera forming an alternate embodiment of the invention;

FIG. 7 shows a graded density filter.

Figure 4:
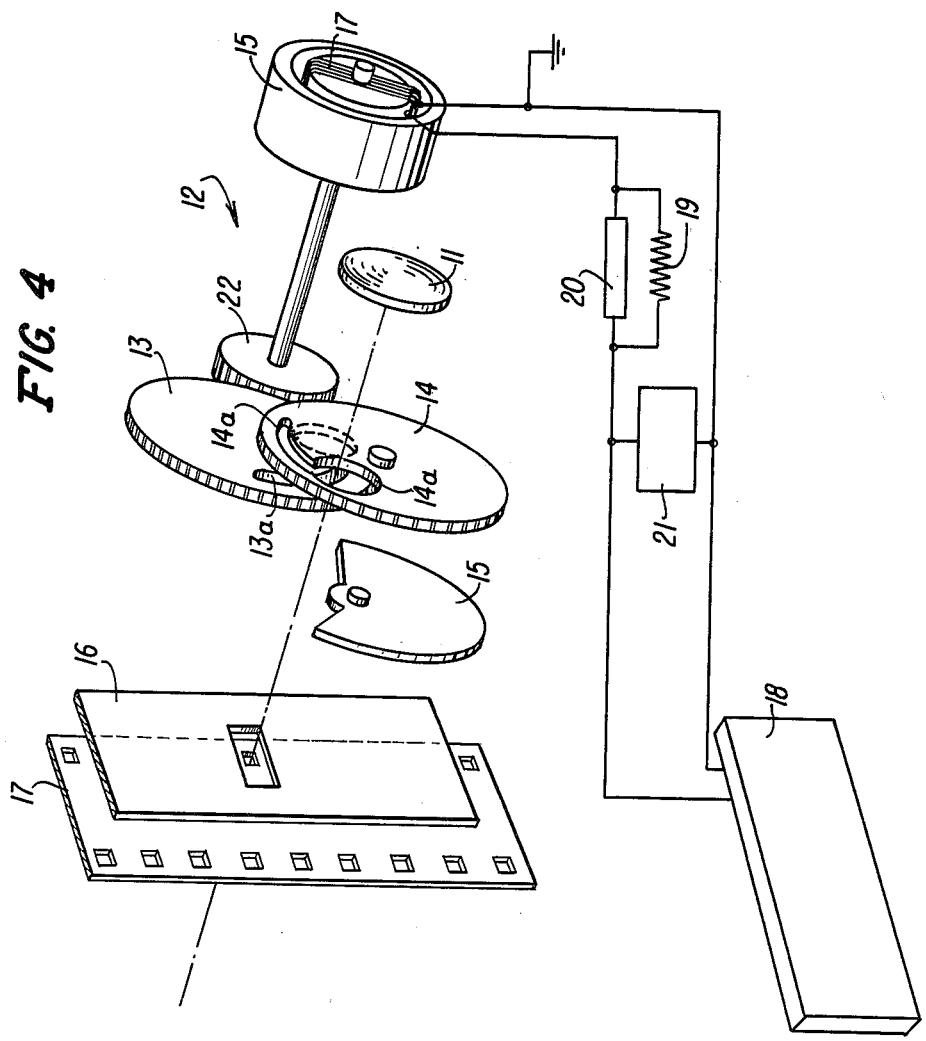
FIG. 4 is a schematic perspective view of an automatic exposure control of the camera of FIG. 1.

The invention provides backlight and reflectance error compensation devices for cameras in which a compensating photocell is positioned in a generally tubular sunshade preferably being one cell of an acceptance angle grid having a main photocell therebehind. In one embodiment, the compensating photocell is disposed horizontally on the bottom of the sunshade to receive direct rays from the sun in backlighting conditions and preferably having a mask thereover differentially masking off the compensating photocell to geometrically reduce the light from the sun as the sun is more vertical. In another embodiment of the invention, a compensating photocell is mounted vertically in a sunshade and a reflector is positioned at the bottom of the sunshade for reflecting light to the compensating photocell. In a further embodiment of the invention, a compensating photocell is positioned vertically and spaced behind a small aperture with a mask positioned over the photocell with opaque portions over the portions of the photocell which receive light corresponding to the field of view of a camera of which the compensating photocell is a part.

Referring now to FIGS. 1 to 4 of the drawings, a motion picture camera 10 includes an optical objective 11 having a normally horizontal axis and a predetermined field of view together with an automatic exposure control device 12 (FIG. 4). The exposure control device includes a pair of geared iris or diaphragm discs or blades 13 and 14 known in the art and driven by a galvanometer 15 through gear 16 keyed to rotatable spring biased coil 17. The blades 13 and 14 have openings 13a and 14a which intersect at the optical axis of the objective 11 which may be termed the axis of the camera. Light travels from the blades 13 and 14 past a known shutter 15 and through aperture plate 16 to a film 17 to expose the film. The galvanometer coil is driven against the action of its known spring (not shown) in a light reducing direction substantially in proportion to the brightness of light falling on main or primary photocell 18 which is a photovoltaic cell. The photocell 18 supplies power to the galvanometer coil 17 through a resistor 19 and temperature compensating thermistor 20. A compensating photocell 21 is connected in the circuit to compensate for backlighting and the reflectance error occurring during photographing a backlighted scene. In the circuit shown in FIG. 4, the photocell 21 is of the photoresistive type and is connected in shunt with the photocell 18. However, the photocell 21 also may be of the photovoltaic type and connected in series with the photocell 18 and the meter coil 17 in opposition to the photocell 18.

The photocell 18 is positioned behind aligned front and back grids 22 and 23 (FIG. 2) which define acceptance angle of the photocell 18 and are located at the front of the camera with their cellular light passages parallel and close to the optical axis of the camera. A filter 24 filters out the portion of the daylight spectrum not present in the indoor (tungsten) spectrum. The compensating photocell 21 is fixed by lugs 25 in a horizontal position at the bottom of one of the lowermost passages in the grid 23 so as to receive direct rays from the sun during all backlighting except that in which the sun is almost directly overhead, which is the mildest condition of backlighting. A differentiating mask 26, which may be a developed and fixed photographic negative, has a transparent portion 26a and opaque portions 26b is positioned over the photocell 21. The transparent portion 26a is narrow at the front and increases in width geometrically relative to the length proceeding from the front of the mask toward the rear thereof. This is such as to permit, with the shading effect of the grid 22, only a small amount of sun rays 27 to impinge on the photocell 21 when the sun is uppermost during backlighting and the camera axis is horizontal. As the angle between the sun and the horizontal decreases, backlighting and reflectance therefrom increases and the direct rays from the sun impinge to an extreme farther to the right on the transparent portion 26a and therethrough to a larger area of the photocell 21 to cause the photocell 21 to shunt more current from the galvanometer coil 17 (FIG. 4). By the position of the photocell 21 at the bottom of the tubular light shade in which the photocell is positioned, substantially all backlighting rays at the same angle relative to the horizontal as the backlighting reflectance error rays from the sun which are reflected from the bottoms of the other cells in the grids 22 and 23 to the main photocell 18 are received on the mask 26. Thus, the compensating photocell 21 received some of the light which normally causes reflectance error, the tapering shape of the transparent portion 26a being such as to permit the light falling on the cell 21, the compensating light, to be just enough to correct the positions of the iris blades 13 and 14 (FIG. 4) to provide the desired exposure of the film 17, the characteristics of the galvanometer circuit being substantially the same as disclosed in the above mentioned co-pending application Serial No. 816,796.

In a camera 31 (FIG. 5) forming a further embodiment of the invention, a compensating photocell 32 is mounted vertically in a cell in back grid 23 by lugs 33 and filter 24 positioned between the grids 23 and 24. A mirror 34 is covered by a graded density mask or filter 35. The mirror deflects toward the cell 32 the rays which are at an angle such as to cause error in lighting the main photocell, that is backlighting and reflectance error rays. A second mask 36 opaque except for a horizontal transparent slot 36a meters the light to the photocell with the mask 35. The mask 35 is substantially fully transparent at the lefthand edge thereof and becomes increasingly opaque proceeding to the right so that more light is reflected to the slot 36a when the sun 37 is lower than when the sun is higher. This is so since the angle of incidence of the sun on the mirror is equal to the angle of reflection from the mirror to the slot 36a. It is obvious that when the sun is higher, the portion of the light received at the slot 36a must pass through a more opaque portion of the mask or filter 35 since it must be reflected off the righthand end of the mirror. The exposure control of the camera 31 otherwise is like that of the camera 10.

In the embodiment of the invention shown in FIGS. 6 and 7, the pinhole camera principle is used for backlight and reflectance error compensation with a large compensating photocell 41 positioned in a large passageway 42a in grid 42 and between grids 42 and 43. A front mask 44 has a hole 44a for receiving light. A graded density filter 45 fully transparent in its center portion aligned horizontally with the center of hole 44a and decreasing substantially uniformly in transparency from the central portion outwardly. This has the effect of decreasing the light to the cell 41 as the angle between the sun and the camera becomes greater during backlighting.

The above described cameras have automatic control of exposure with compensation provided for reflectance light error as well as for direct backlighting error.

While the invention is thus described, it is not wished to be limited to the precise details described, as changes may be readily made without departing from the spirit of the invention.

What is claimed is:

1. In an automatic exposure control for a camera having a predetermined optical axis and including a main photocell, grid means having a plurality of cells extending generally parallel to the optical axis and positioned in front of the main photocell, the improvement comprising compensating photocell means positioned at the bottom of one of the cells.

2. The automatic exposure control of claim 1 wherein the compensating photocell means comprises a compensating photocell and a mask having a light passage of a predetermined pattern positioned over the compensating photocell.

3. The automatic exposure control of claim 2 wherein the mask admits progressively more light to the compensating photocell proceeding from the front of the cell toward the rear thereof.

4. In an automatic exposure control for a camera having a predetermined optical axis, grid means having a plurality of cells, a main photocell positioned behind the grid means, a compensating photocell positioned to receive light through one of the cells, and means at said one cell for masking off increasingly greater portions of light falling within the field of acceptance of said one cell when said light emanates from a source at an increasingly greater angle above the horizontal, whereby said compensating photocell will have a greater effect in reducing the effect of said main photocell when the source of light is close to the horizontal, as in a backlighting situation, than when it approaches the vertical.

References Cited in the file of this patent
UNITED STATES PATENTS

| | | |
|---|---|---|
| 2,358,084 | Mihalyi | Sept. 12, 1944 |
| 2,378,433 | Riszdorfer | June 19, 1945 |
| 2,841,064 | Bagby | July 1, 1958 |
| 3,001,443 | Stimson | Sept. 26, 1961 |